(12) United States Patent
Bertsch et al.

(10) Patent No.: US 6,754,597 B2
(45) Date of Patent: Jun. 22, 2004

(54) METHOD AND DEVICE FOR ASSESSING THE STABILITY OF AN ELECTRIC POWER TRANSMISSION NETWORK

(75) Inventors: Joachim Bertsch, Baden-Dattwil (CH); Mehmet Kaba, Windisch (CH); Odd Lekva, Oslo (NO)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 09/800,570

(22) Filed: Mar. 8, 2001

(65) Prior Publication Data

US 2001/0021896 A1 Sep. 13, 2001

(30) Foreign Application Priority Data

Mar. 10, 2000  (EP) ............................................. 00810204

(51) Int. Cl.⁷ .............................................. G01R 31/08
(52) U.S. Cl. .......................... 702/57; 700/292; 324/521
(58) Field of Search ..................... 702/62, 57; 700/292, 700/294, 295; 323/204, 210; 324/508, 521, 86, 107

(56) References Cited

U.S. PATENT DOCUMENTS

| | | | | |
|---|---|---|---|---|
| 5,272,462 A | * | 12/1993 | Teyssandier et al. | 340/310 R |
| 5,428,549 A | * | 6/1995 | Chen | 364/483 |
| 5,455,776 A | * | 10/1995 | Novosel | 364/492 |
| 5,703,791 A | | 12/1997 | Amano et al. | 364/492 |
| 5,796,258 A | * | 8/1998 | Yang | 324/522 |
| 5,995,911 A | | 11/1999 | Hart | 702/64 |
| 6,249,719 B1 | * | 6/2001 | Vu et al. | 700/292 |
| 6,313,752 B1 | * | 11/2001 | Corrigan et al. | 340/657 |
| 6,415,244 B1 | * | 7/2002 | Dickens et al. | 702/187 |

FOREIGN PATENT DOCUMENTS

EP  0940901 A2  9/1999

OTHER PUBLICATIONS

"A Simple Approach to Voltage Stability Assessment in Radial Networks", Gubina, et al., IEEE Transactions on Power Systems, vol. 12, No. 3, Aug. 1997, pp. 1121–1126.
"Synchronized Phasor Measurement System Project at Southern California Edison Co.", Bhargava, IEEE Transactions, 1999, pp. 16–22.

(List continued on next page.)

Primary Examiner—Marc S. Hoff
Assistant Examiner—Paul L. Kim
(74) Attorney, Agent, or Firm—Burns, Doane, Swecker & Mathis, L.L.P.

(57) ABSTRACT

The inventive method assesses the stability of an electric power transmission network, where said network comprises a plurality of substations, buses and lines, and a system protection center (8). It comprises the steps of 1. measuring phasor data (9) for voltages and currents at a plurality of locations of the network,
2. transmitting said phasor data (9) to said system protection center (8),
3. transmitting information (5) regarding the state of switches of at least one substation to the system protection center (8), and
4. the system protection center (8) determining at least one stability margin value of the transmission network.

In this way, detailed real-time information about the state of the network is collected at a system level of the network, allowing a corresponding global analysis of the information.

In a preferred embodiment of the invention, the system protection center determines one or more control commands (6), based on the phasor data (9) and on the state of switches. The control commands (5) are transmitted to at least one substation and executed there.

9 Claims, 2 Drawing Sheets

OTHER PUBLICATIONS

IEEE Computer Applications in Power, vol. 6, No. 2, Apr. 1993, author: A.G. Phadke, pp. 11–15.

"Grids Get Smart Protection and Control", Vu, et al., IEEE Computer Applications in Power, Oct. 1997, pp. 40–44.

"Use of Local Measurements to Estimate Voltage–Stability Margin", Vu, et al., Power Industry Computer Applications (PICA), May 1997.

"Voltage Instability Predictor (VIP) and its Applications", Vu, et al., presentation paper, 2000.

* cited by examiner

METHOD AND DEVICE FOR ASSESSING THE STABILITY OF AN ELECTRIC POWER TRANSMISSION NETWORK

This application claims priority under 35 U.S.C. §§ 119 and/or 365 to Appln. No. 00810204.8 filed in Europe on Mar. 10, 2000; the entire content of which is hereby incorporated by reference.

DESCRIPTION

1. Field of the Invention

The invention relates to large-scale electric power transmission networks, and, more particularly, to a method and a device for assessing the stability of an electric power transmission network according to the preamble of claims 1 and 7.

2. Background of the Invention

Electric power transmission and distribution systems or networks comprise high-voltage tie lines for connecting geographically separated regions, and substations for transforming voltages and for switching connections between lines. Power generation and load flow in a network with several substations is controlled by a central energy management system. Measurements of average RMS (root mean square) values of voltages, currents, active power and reactive power flowing in the network are made at various places in the network. The measurements from throughout the network are collected at the energy management system, providing a snapshot of the state of the network. Such a snapshot is updated roughly every 30 seconds. The snapshot gives a static view of the network state, in particular of load flows.

A method for assessing network stability, based on voltage margins, is described in the paper "Use of local measurements to Estimate Voltage-Stability Margin", K. Vu et al., Power Industry Computer Applications (PICA) May 12–16, 1997, IEEE, and in "Voltage instability predictor (VIP) and its applications", K. Vu et al., Power Systems Computation Conference (PSCC) June 1999. Both articles are herewith incorporated by reference. These articles describe a "Voltage Instability Predictor" (VIP) which measures currents and voltages locally in order to infer a proximity to voltage collapse. The concept of the VIP is shown in FIG. 1. One part of an electric power system is treated as a power source, another part as a load. The power source is represented by its Thévenin equivalent 21 with a Thévenin impedance $Z_{Thev}$. The load is represented by an apparent load impedance $Z_{APP}$. Both the Thévenin impedance $Z_{Thev}$ and the apparent load impedance $Z_{APP}$ are estimated from the current and voltage measurements by a VIP device 22. The relation of these impedances indicates how close the power source is to collapsing. The paper "Grids get smart protection an control", K. Vu et al, IEEE Computer Applications in Power, October 1997, discloses VIP devices reporting their findings such as a proximity to collapse to an energy management system.

U.S. Pat. No. 5,734,586 discloses a system for optimising a steady state in an unbalanced power distribution network having a star-shaped structure. The optimisation starts with data representing the state of the network and determines switching commands for reconfiguring lines and control commands for capacitors and voltage regulators for reactive power compensation.

In all the cited documents, reaction times at a system level are limited by the relatively slow system management functions.

DESCRIPTION OF THE INVENTION

It is therefore an object of the invention to create a method and a device for assessing the stability of an electric power transmission network that offers an improved, dynamic view of the state of the network. A further object of the invention is to enable a fast reaction at a network level to sudden changes in load conditions.

These objects are achieved by a method and a device for assessing the stability of an electric power transmission network according to the claims 1 and 7.

The inventive method assesses the stability of an electric power transmission network, where said network comprises a plurality of substations, buses and lines, and a system protection center. It comprises the steps of 1. measuring phasor data for voltages and currents at a plurality of locations of the network,
2. transmitting said phasor data to said system protection center,
3. transmitting information regarding the state of switches of at least one substation to the system protection center, and
4. the system protection center determining at least one stability margin value of the transmission network.

In this way, detailed real-time information about the state of the network is collected at a system level of the network, which allows a corresponding global analysis of the information.

In a preferred embodiment of the invention, the system protection center determines one or more control commands, based on the phasor data and on the state of switches. The control commands are transmitted to at least one substation and executed there.

The system protection center and method in accordance with the invention provide protection of the power network at the system level, in contrast to existing protection schemes that operate locally and only protect individual transmission lines or substation components such as transformers or generators.

In another preferred embodiment of the invention, the system protection center determines information about a state of the network, e.g. power flow and potential or estimated future limits or bottlenecks, i.e. overload conditions to be expected at a given line or substation. This information is transmitted to the energy management system which then controls power generation and power flow within the network according to the network state information. Since this manner of control uses a prediction of the network's behaviour, overloading of network components is anticipated and avoided before components of the network exceed their operating limits and have to be shut down, potentially aggravating the condition of the network even further.

Since the inventive method and device utilise phasor data, they rely on real-time information on currents, voltages and power, with a high temporal resolution. This is in contrast to scalar information such as RMS values, which corresponds to an average computed over at least one period and is non-real-time information. Such non-real-time information, as it is used in existing energy management systems, has update intervals around 30 seconds. As a result, a reaction time of the inventive method to detect a potential network instability, to determine countermeasures and to issue corresponding control commands is less than 100 milliseconds and typically less than 50 milliseconds. Such a fast reaction time further reduces the danger of disruptive events caused by an overloaded or unstable network.

In a further preferred embodiment of the invention, the phasor data is associated with timing information obtained from a common time distribution system.

Further preferred embodiments are evident from the dependent patent claims.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION OF PREFERRED EMBODIMENTS

Figure 2:
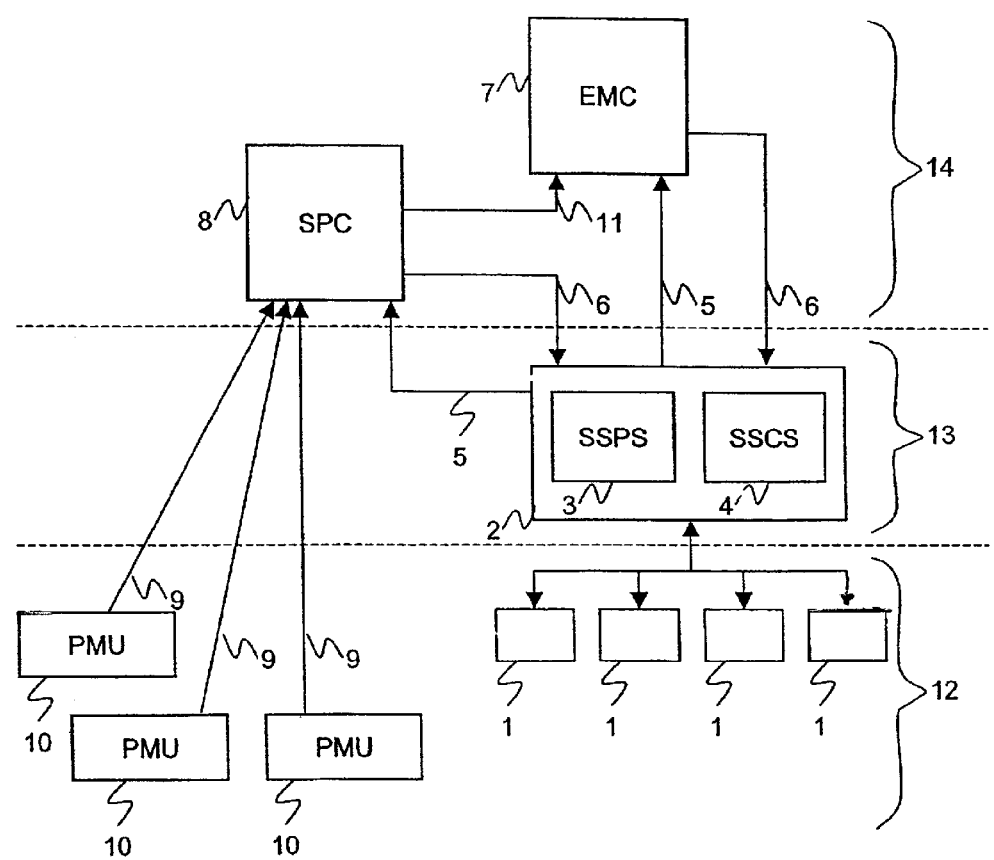
FIG. 2 shows schematically a structure of devices and information flow for carrying out the invention.

FIG. 2 shows a structure of a control system for a power transmission network which includes a device for carrying out the invention. The control system is structured hierarchically into a bay level 12, a station level 13 and a network level 14. The bay level 12 comprises bay devices 1, including for example fault recording, bay protection, bay control, load tap change, load shedding and monitoring devices. The station level 13 comprises a substation automation system 2 which in turn comprises a substation protection system 3 and a substation control system 4. The substation automation system 2 communicates with the bay devices 1 by dedicated signal lines and/or a local area network. The substation automation system 2 collects data from the bay devices 1 and issues switching and other control commands to the bay devices 1. Other control commands comprise transformer tap settings or the control of reactive compensation devices such as capacitor banks or FACTS devices. Under normal conditions, the substation automation system 2 operates without any human operators being present at the substation.

At the network level 14, an energy management system 7 collects substation data 5 from a plurality of substation automation systems 2. The collected data provides an overview of the state of the network. Based on this overview, the energy management system 7 controls power generation and load flow in the network by issuing control commands 6 to the plurality of substation automation systems 2 and/or to power plants. Usually, this energy management process involves human decision-making and intervention. For large networks with e.g. more than 10–15 substations and depending on a geographic distribution of the network, the network level comprises a hierarchy of energy management systems 7, with one central energy management system 7 co-ordinating a number of dependent energy management systems 7.

In order to carry out the inventive method, the system comprises, at the network level 14, an inventive device, that is, a system protection center 8. The system protection center 8 receives phasor data 9 from phasor measurement units 10 residing, for example, at feeders at the bay level 12 of a plurality of substations and/or residing at branching points along transmission lines. The system protection center 8 receives substation data 5 from the substation automation systems 2 and transmits control commands 6 to the substation automation systems 2.

In the case when there is a hierarchy of energy management systems 7, there preferably is a plurality of system protection centers 8, where each system protection center 8 is associated with one of the dependent energy management systems 7.

The phasor data 9 represents a phasor and may be a polar number, the absolute value of which corresponds to either the real magnitude or the RMS value of a quantity, and the phase argument to the phase angle at zero time. Alternatively, the phasor may be a complex number having real and imaginary parts or the phasor may use rectangular or exponential notation. Phasors may be used to represent quantities such as the voltage, current, power or energy associated with a phase conductor or an electronic circuit. By contrast, conventional sensing devices used in power networks generally measure only scalar, average representations, such as the RMS value of a voltage, current etc.

In the inventive method, the phasor data 9 is collected from phasor measurement units 10 that are distributed over a large geographic area, i.e. over tens to hundreds of kilometers. Since the phasor data 9 from these disparate sources are analysed in conjunction, they must refer to a common phase reference. In other words, the different phasor measurement units 10 must have local clocks that are synchronised to within a given precision.

Such a synchronisation of the phasor measurement units 10 is preferably achieved with a known time distribution system, for example the global positioning (GPS) system. In a typical implementation, the phasor data 9 is determined at least every 200 or every 100 or preferably every 40 milliseconds, with a temporal resolution of preferably less than 1 millisecond. Each measurement is associated with a time stamp derived from the synchronised local clock. The phasor data 9 therefore comprises time stamp data.

The inventive method assesses the stability of the electric power transmission network by determining a stability margin value pertinent to specific entities and/or a combination of entities within the network. In the VIP system as described in the background of the invention, a measure of stability is expressed in terms of impedances or, as a voltage margin, in terms of voltages. In a preferred embodiment of the invention, a power margin is used as a stability margin. A power margin is a more intuitive representation than a voltage or impedance margin. A local power margin represents for example the amount of power that may be transmitted through a given transmission line of the network. A global power margin combines phasor data 9 collected from a plurality of phasor measurement units 10.

Figure 1:
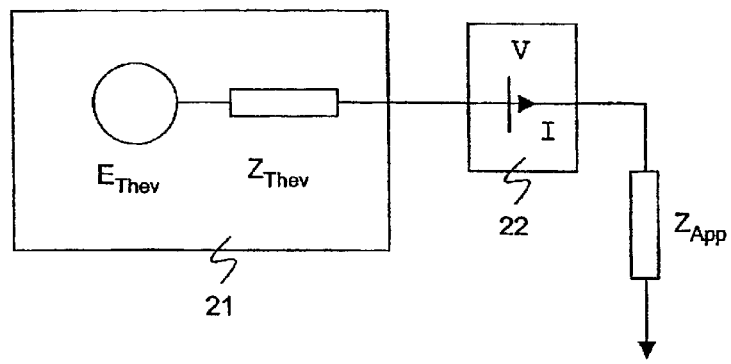
FIG. 1 shows schematically a conceptual structure for assessing network stability, according to the state of the art.
Figure 3:
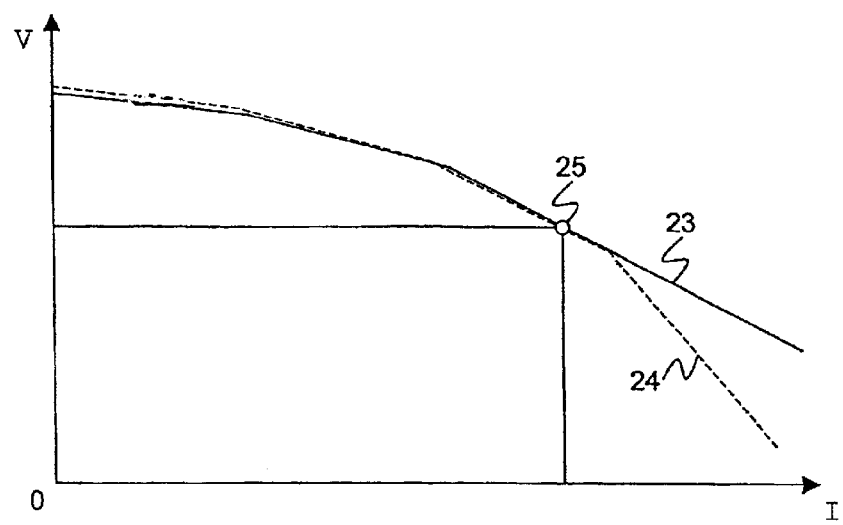
FIG. 3 is a diagram showing currents and voltages at a selected point in an electric power network.

FIG. 3 shows a plot of voltage and current at a given point in a power network, where a VIP device is located. This may be at a feeder of a tie line or a load. When the load gets stronger, the current increases and the voltage drops. The actual voltage versus current curve (V/I curve) is represented by the drawn out line 23. The actual behaviour is influenced by the entire network, but is estimated from local measurements by the VIP device. The VIP computes provides an estimate of this curve, shown by the dashed line 24. In particular, the slope of the curve corresponds to the Thévenin impedance $Z_{Thev}$ computed by the VIP device. Given this estimated curve, the maximum power, in MVA, that may be transmitted through said feeder under the current network conditions is computed. The maximum power corresponds to a point on the estimated V/I curve 24 for which the product of current and voltage is maximal. The power margin, for a present operating point 25, is the difference between the maximum power and the power being currently transmitted. Let the present time current and voltage be $I_t$ and $V_t$, respectively. Then the local power margin $\Delta S$ corresponding to said feeder is $$\Delta S = \frac{(V_t - Z_{Thev} I_t)^2}{4 Z_{Thev}}$$

In summary, the power margin computation method gives, based on online current and voltage phasor measurements, a continuously adapted estimate of how much more power may be transferred through a tie line or how much more power may be drawn by a substation before the network collapses. This is particularly advantageous in situations where the network state slowly moves towards instability, without tell-tale disruptive events that would indicate a critical situation.

In a further preferred embodiment of the invention, a global power margin combines phasor data 9 collected from a plurality of phasor measurement units 10. A global power margin is therefore not associated with a single VIP device, but with a combination of network entities such as feeders, lines or substations. A global power margin is preferably determined by the system protection center 8. There follow some preferred methods for determining global power margins for specific network arrangements.

For a plurality of feeders connected to the same busbar, where each feeder is associated with a phasor measurement unit 10, a global power margin is computed by regarding the sum of loads of the plurality of feeders as a single lumped load. The global power margin is computed in a similar manner as the local power margin described above, but with the current phasor measurements of the individual phasor measurement units 10 being added to provide a sum of currents on which further computations are based.

If a plurality of power generators and a plurality of loads are connected via common transmission lines, then the power margins are calculated locally for e.g. each line and each load. The global power margin corresponds to the worst case, i.e. it is equal to the smallest of the local power margins. The local information is used to co-ordinate the load shedding, such that only the minimum amount of power is shed in the most critical place.

When several substations supply the same load, a weighted average voltage is assessed for the substations. The branch currents from the substations are added together, and the apparent load impedance is calculated and the network equivalent estimated.

In order to compute a global stability margin, the topology of the network must be known. For this reason, the substation automation systems 2 transmit substation data 5, in particular information about switch states of the substation, to the system protection center 8.

The inventive method therefore comprises the steps of
1. measuring phasor data 9 for voltages and currents at a plurality of locations of the network,
2. transmitting said phasor data 9 to said system protection center 8,
3. transmitting information regarding the state of switches 5 of at least one substation to the system protection center 8, and
4. the system protection center 8 determining at least one stability margin value of the transmission network.

In a preferred embodiment, the inventive method further comprises the steps of
1. determining one or more control commands 6, based on the phasor data 9 and on the state of switches 5,
2. transmitting the control commands 6 to at least one substation, and
3. executing the control commands 6 at the at least one substation.

In order to generate meaningful control commands 6 for the substation automation systems 2, the network topology is known to the system protection center 8. Having the system protection center 8 issue direct control commands 6 to the substation automation system 2 allows short reaction times to observed events and network conditions, in particular to the danger of instability. Such short reaction times are less than 100 milliseconds, typically less than 50 milliseconds. This compares favourably with the current practice of reacting to network level abnormalities through energy management systems 7 which are limited by update cycle times of approximately 30 seconds.

Examples of such immediate intervention of the system protection center 8 in the operation of a substation automation system 2 are the shedding of critical loads and the control of reactive power compensation devices.

In a further preferred embodiment, the inventive method further comprises the steps of
1. the system protection center 8 determining network state information 11, such as power flow and potential or estimated future limits,
2. the system protection center 8 transmitting said network state information 11 to an energy management system 7,
3. the energy management system 7 controlling power generation and power flow within the network according to the network state information 11.

Examples of such indirect intervention of the system protection center 8 via a energy management system 7 are the control of power generation and of load shedding.

In a preferred embodiment of the invention, the decision on whether certain network conditions automatically cause the system protection center 8 to issue control commands 6 to a substation automation system 2, or whether an operator at an energy management system 7 is alerted, depends on the system protection center 8 being in an automatic or manual mode.

In another preferred embodiment of the invention, the system protection center 8 provides other functions that are based on a system wide collection of detailed network quantities. For example, the system protection center 8 identifies loads or line sections that often are associated with failures or with near network instability. Such an analysis is a basis for preventive maintenance or an upgrade of installations.

In a further preferred embodiment of the invention, a system protection center 8 or a plurality of system protection centers 8 are installed as systems separate from energy management systems 7. This allows to upgrade existing energy management systems 7 with the functionality of the inventive system protection center 8. For completely new installations, the parallel arrangement and partially independent operation of an energy management system 7 and a system protection center 8 increases reliability.

The inventive device or system protection center 8 comprises a data concentrator unit, a system protection unit, an automated control unit, an asset management unit and a fault evaluation unit.

The data concentrator unit collects, pre-treats and stores the phasor data 9 received from the phasor measurement units 10. It also collects associated substation data 5, in particular network topology information. All collected data is associated with a time stamp. The data concentrator unit provides the collected information to the other units.

The system protection unit dynamically generates network state information 11 from the data provided by the data concentrator unit. Such network state information 11 comprises local and/or global voltage and/or power margins and a transmission capability. This network state information 11 can be monitored by an operator.

The automated control unit, depending on whether it is in an automatic or manual mode, generates control commands 6 from the network state information 11 and from the data provided by the data concentrator unit.

The asset management unit collects monitoring data from individual components and provides information about the state of the component. In a preferred embodiment of the invention, this component state information is taken into account by the automatic control unit.

As a summary, the system protection center 8 comprises a data concentrator unit for storing phasor data 9 from a plurality of phasor measurement units 10 that are distributed over the power transmission network and for storing substation data 5 from a plurality of substation automation systems 2. Both kinds of data are associated with timing information. The system protection center 8 further comprises a system protection unit for generating at least one stability margin value of the transmission network and other network state information 11.

In a preferred embodiment, the system protection center 8 further comprises an automated control unit for generating control commands 6 for a substation automation system 2 from the at least one stability margin value and other network state information 11 and from data provided by the data concentrator unit.

In another preferred embodiment, the system protection center 8 comprises means for transmitting network state information 11 to an energy management system 7.

LIST OF REFERENCE SYMBOLS

1 bay device
2 substation automation system
3 substation protection system SSPS
4 substation control system SSCS
5 substation data
6 control commands
7 energy management system EMS
8 system protection center SPC
9 phasor data
10 phasor measurement unit PMU
11 network state information
12 bay level
13 station level
14 network level
21 Thévenin equivalent
22 voltage instability predictor VIP
23 actual V/I curve
24 estimated V/I curve
25 operating point

What is claimed is:

1. Method for assessing the stability of an electric power transmission network, where said network comprises a plurality of substations, buses and lines, and a system protection center, comprising:
    a) measuring phasor data for voltages and currents at a plurality of locations of the network,
    b) transmitting said phasor data to said system protection center,
    c) transmitting information regarding the state of switches of at least one substation to the system protection center, and
    d) the system protection center determining at least one stability margin value of the transmission network from said phasor data and said information regarding the state of switches.

2. The method claimed in claim 1, comprising:
    a) the system protection center determining one or more control commands,
    b) the system protection center transmitting said control commands to the at least one substation, and
    c) the substation executing said control command.

3. The method claimed in claim 1, comprising:
    a) the system protection center determining network state information,
    b) the system protection center transmitting said network state information to an energy management system, and
    c) the energy management system controlling power generation and power flow within the network according to the network state information.

4. The method claimed in claim 1, wherein the phasor data is measured at least every 100 milliseconds.

5. The method claimed in claim 1, wherein the phasor data is associated with a time stamp that has a temporal resolution smaller than one millisecond.

6. The method claimed in claim 1, wherein the measurement of phasor data is synchronised by timing information from the global positioning system.

7. A system protection center for assessing the stability of an electric power transmission network, comprising: a data concentrator unit for storing phasor data for voltages and currents measured at a plurality of locations of the network and transmitted to the system protection center, and for storing information regarding the state of switches of at least one substation and transmitted to the system protection center and a system protection unit for generating at least one stability margin value of the transmission network from the phasor data and the information regarding the state of the switches.

8. The system protection center as claimed in claim 7, comprising an automated control unit for generating control commands for a substation automation system from the at least one stability margin value and from data provided by the data concentrator unit.

9. The system protection center as claimed in claim 7, comprising means for transmitting network state information to an energy management system of the transmission network.

* * * * *